United States Patent
Liao et al.

(10) Patent No.: US 10,628,721 B2
(45) Date of Patent: Apr. 21, 2020

(54) METHOD FOR CONNECTING RECYCLABLE LOGISTICS APPARATUS

(71) Applicant: SHANGHAI HONGYAN RETURNABLE TRANSIT PACKAGINGS CO., LTD, Shanghai (CN)

(72) Inventors: Qingxin Liao, Shanghai (CN); Chunjiang Ye, Shanghai (CN); Yiwen Cao, Shanghai (CN)

(73) Assignee: SHANGHAI HONGYAN RETURNABLE TRANSIT PACKAGINGS CO., LTD, Shanghai (CN)

( * ) Notice: Subject to any disclaimer, the term of this patent is extended or adjusted under 35 U.S.C. 154(b) by 0 days.

(21) Appl. No.: 15/555,383

(22) PCT Filed: Mar. 4, 2016

(86) PCT No.: PCT/CN2016/075640
§ 371 (c)(1),
(2) Date: Sep. 1, 2017

(87) PCT Pub. No.: WO2016/138878
PCT Pub. Date: Sep. 9, 2016

(65) Prior Publication Data
US 2018/0039872 A1 Feb. 8, 2018

(30) Foreign Application Priority Data
Mar. 4, 2015 (CN) .......................... 2015 1 0097220

(51) Int. Cl.
*G08C 19/04* (2006.01)
*G06K 19/07* (2006.01)
(Continued)

(52) U.S. Cl.
CPC ......... *G06K 19/0704* (2013.01); *G06Q 10/08* (2013.01); *G06Q 10/30* (2013.01);
(Continued)

(58) Field of Classification Search
CPC .... G06K 19/0704; H04W 4/80; H04W 4/008; G06Q 10/30; G06Q 50/28; G06Q 10/08; Y02W 90/20; B65D 2590/0083
(Continued)

(56) References Cited

U.S. PATENT DOCUMENTS 5,814,968 A * 9/1998 Lovegreen .......... H01M 2/1022
320/113
5,999,088 A * 12/1999 Sibbitt ................... G08B 5/229
340/7.55
(Continued)

FOREIGN PATENT DOCUMENTS

CN 101432197 5/2009
CN 201395291 2/2010
(Continued)

OTHER PUBLICATIONS

International Search Report for international application No. PCT/CN2016/075640, dated May 5, 2016 (6 pages, including English translation).
(Continued)

*Primary Examiner* — Zhen Y Wu
(74) *Attorney, Agent, or Firm* — Hamre, Schumann, Mueller & Larson, P.C.

(57) ABSTRACT

The present invention relates to a method for connecting recyclable logistics apparatus, the recyclable logistics apparatus comprises a wireless beacon unit which periodically transmits a broadcast frame, and the method comprising the following steps: providing a plurality of contact points inside each recyclable logistics apparatus, making a connec-
(Continued)

tion between the contact points of each recyclable logistics apparatus, and implanting wires inside each recyclable logistics apparatus for connecting the wire beacon unit and the contact points; and connecting a plurality of recyclable logistics apparatuses in a predetermined manner, so that when a plurality of recyclable logistics apparatuses are stacked as a stack, a parallel circuit is formed in part region inside the stack of recyclable logistics apparatuses. Through this technical solution, the subsequent work efficiency is doubled, the time is greatly saved and the workload is reduced.

8 Claims, 7 Drawing Sheets

(51) Int. Cl.
  *G06Q 50/28* (2012.01)
  *G06Q 10/08* (2012.01)
  *H04W 4/80* (2018.01)
  *G06Q 10/00* (2012.01)

(52) U.S. Cl.
  CPC .............. *G06Q 50/28* (2013.01); *H04W 4/80* (2018.02); *B65D 2590/0083* (2013.01); *Y02W 90/20* (2015.05)

(58) Field of Classification Search
  USPC .................................................... 340/870.11
  See application file for complete search history.

(56) References Cited

U.S. PATENT DOCUMENTS

| | | | | |
|---|---|---|---|---|
| 6,573,824 | B1* | 6/2003 | Lovegreen | A63F 13/12 340/7.1 |
| 7,636,796 | B2* | 12/2009 | Zhao | G06F 15/7867 361/790 |
| 2005/0080676 | A1* | 4/2005 | Lovegreen | G06Q 10/02 705/15 |
| 2007/0040652 | A1* | 2/2007 | Quatro | G06Q 50/12 340/7.55 |
| 2007/0255786 | A1* | 11/2007 | Mock | G06Q 10/109 709/204 |
| 2008/0272889 | A1* | 11/2008 | Symons | H02J 50/10 340/10.1 |
| 2009/0091425 | A1* | 4/2009 | Sharpe | H04W 88/023 340/7.21 |
| 2010/0219975 | A1* | 9/2010 | Kim | G09B 5/06 340/4.1 |
| 2010/0315244 | A1* | 12/2010 | Tokhtuev | G08B 21/245 340/603 |
| 2012/0054016 | A1* | 3/2012 | Todd | G06Q 20/20 705/14.38 |
| 2012/0206237 | A1* | 8/2012 | Lovegreen | H04Q 9/00 340/10.1 |
| 2013/0246299 | A1* | 9/2013 | Lovegreen | G06Q 30/0281 705/346 |
| 2014/0042808 | A1* | 2/2014 | Lovegreen | H02J 4/00 307/11 |
| 2014/0114807 | A1* | 4/2014 | Baker | G06Q 30/016 705/26.41 |
| 2014/0118113 | A1* | 5/2014 | Kaushik | H04W 12/12 340/8.1 |
| 2014/0274492 | A1* | 9/2014 | Kennedy | A63B 67/08 473/514 |
| 2015/0177713 | A1* | 6/2015 | Lovegreen | G05B 19/0426 700/19 |
| 2015/0294084 | A1* | 10/2015 | McCauley | G06F 19/328 705/2 |
| 2016/0069983 | A1* | 3/2016 | Gonia | G01S 5/0205 455/456.1 |
| 2016/0241062 | A1* | 8/2016 | Shau | H02M 7/04 |
| 2016/0345377 | A1* | 11/2016 | Lindoff | H04W 88/06 |

FOREIGN PATENT DOCUMENTS

| | | |
|---|---|---|
| CN | 103530749 | 1/2014 |
| CN | 203387211 | 1/2014 |
| CN | 203512231 | 4/2014 |
| CN | 103929481 | 7/2014 |
| CN | 104376443 | 2/2015 |
| CN | 104732366 | 6/2015 |
| CN | 104734863 | 6/2015 |
| CN | 104735059 | 6/2015 |
| JP | 2008-161210 | 7/2008 |
| JP | 4963262 | 6/2012 |
| WO | 2006019929 | 2/2006 |

OTHER PUBLICATIONS

Australian Examination Report issued in the corresponding Australian patent application No. 2016228031, dated Oct. 2, 2018, 4 pages.
Extended European Search Report, issued in the corresponding European application No. 16758493.7, dated Jul. 13, 2018, 9 pages.
Japanese Office Action, issued in the corresponding Japanese patent application No. 2017-0546706, dated Jun. 5, 2018, 4 pages.
Canadian Office Action, issued in the corresponding Canadian patent application No. 2,978,644, dated Jul. 19, 2018, 4 pages.
First Chinese Office Action, issued in the corresponding Chinese patent application No. 201510097220.5, dated Jul. 4, 2017, 12 pages (including machine translation).
Second Chinese Office Action, issued in the corresponding Chinese patent application No. 201510097220.5, dated Aug. 1, 2018, 12 pages (including machine translation).
Third Chinese Office Action, issued in the corresponding Chinese patent application No. 201510097220.5, dated Aug. 22, 2018, 10 pages (including machine translation).

* cited by examiner

Folded

Upright
Fig. 3

METHOD FOR CONNECTING RECYCLABLE LOGISTICS APPARATUS

FIELD OF THE INVENTION

The present invention relates to the logistics field, particularly relates to a method for connecting recyclable logistics apparatus.

BACKGROUND OF THE INVENTION

In the logistics field, it may often track recyclable logistics apparatus. RFID (radio frequency tag) technology is common means for tracking cargos/apparatuses which is implemented in the intelligent logistics field, especially active RFID has good effect of tracking devices/apparatuses at medium distance. At present, when a product is identified using active RFID technology (i.e. wireless radio frequency identification technology with a built-in chip having its own power supply), the operation requires a reader to perform one-to-one reading of an electronic tag of logistics apparatus, and when there is a lot of logistics apparatuses, the reading workload is large and complex where a risk of missed detection easily exists, and labor and time costs are also greatly increased. In addition, recyclable logistics apparatus may also be based on iBeacon technology instead of RFID, and iBeacon protocol is a protocol developed by Apple Company which performs a very accurate micropositioning through low-power Bluetooth(BLE), and begins to be supported from IOS7.0 and Android 4.3. Through this technology, an equipment may receive a certain range of signals transmitted by other iBeacons, meanwhile may also transmit its own information to other users in a certain range. But at this time, there still exists the above problem of large and complex reading workload.

SUMMARY OF THE INVENTION

The purpose of the present invention is to provide a method for connecting recyclable logistics apparatus, which can double the subsequent work efficiency, greatly save time and reduce workload.

In order to solve the above technical problem, one embodiment of the present invention discloses a method for connecting recyclable logistics apparatus, the recyclable logistics apparatus comprises a wireless beacon unit which periodically transmits a broadcast frame, and the method comprises the following steps: providing a plurality of contact points inside each recyclable logistics apparatus, making a connection between the contact points of each recyclable logistics apparatus, and implanting wires inside each recyclable logistics apparatus for connecting the wire beacon unit and the contact points; and connecting a plurality of recyclable logistics apparatuses in a predetermined manner, so that when a plurality of recyclable logistics apparatuses are stacked as a stack, a parallel circuit is formed in part region inside the stack of recyclable logistics apparatuses.

Comparing the embodiments of this invention with prior arts, the main distinctions and their effects are:

Because a parallel circuit is formed in part region inside when a plurality of recyclable logistics apparatuses are stacked as a stack, the subsequent work efficiency is doubled, the time is greatly saved and the workload is reduced.

Further, the broadcast frame further includes battery power information for subsequent charging work, which doubles the charging efficiency.

Further, the broadcast frame further includes identification information for subsequent identification and delivery work, which doubles the identification and delivery efficiency.

DETAILED DESCRIPTION OF THE PREFERRED EMBODIMENTS

In the following description, many technical details are provided for readers to better understand the present application. However, it is understood by those ordinary skilled in the art that the technical solution claimed to be protected by those claims of the present application can also be realized even without these technical details and not based on various changes and modifications of the following embodiments.

For the purpose, technical solution and merits of the present invention to be clearer, the following will further describe the embodiments of the present invention in detail with reference to the accompanying drawings.

Figure 1:
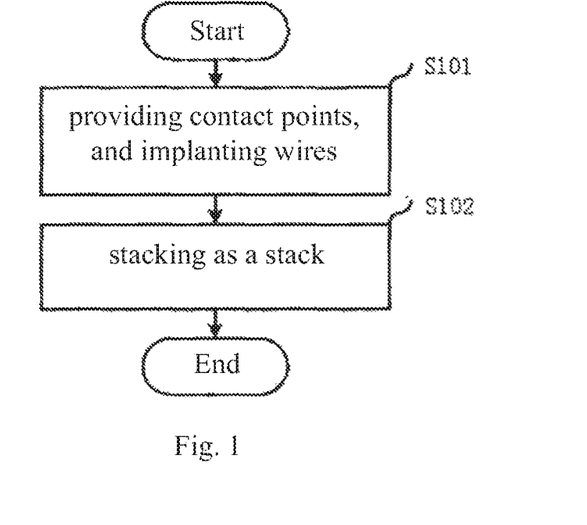
FIG. 1 is a flow diagram of a method for connecting recyclable logistics apparatus according to first embodiment of the present invention.

The first embodiment of the present invention relates to a method for connecting recyclable logistics apparatus. The recyclable logistics apparatus comprises a wireless beacon unit which periodically transmits a broadcast frame. Preferably, the wireless beacon unit is a chip based on one of the following protocols: RFID, Zigbee(Zigbee), Bluetooth, WiFi, iBeacon. Of course, the wireless beacon unit may also be a chip based on other protocol, which is not limited. FIG. 1 is a flow diagram of the method.

As shown in FIG. 1, the method comprises the following steps:

At step S101, a plurality of contact points are provided inside each recyclable logistics apparatus, and connection is made between the contact points of each recyclable logistics apparatus. For example, four corners of the recyclable logistics apparatus may be provided with four contact points, positive and negative electrodes are set apart (i.e. polarities along a diagonal direction are same, such as the electrodes along one diagonal direction are both positive, and the electrodes along the other diagonal direction are both negative). Of course, the setting location is not limited to a corner, and the number of contact points is not limited to four either. Wires are implanted inside each recyclable logistics apparatus for connecting the wireless beacon unit and the contact points.

Then proceeds to step S102, a plurality of recyclable logistics apparatuses are connected in a predetermined manner, so that when a plurality of recyclable logistics apparatuses are stacked as a stack, a parallel circuit is formed in part region inside the stack of recyclable logistics apparatuses. This stacking method will be described in detail later.

Then ends the flow.

In conclusion, because a parallel circuit is formed in part region inside when a plurality of recyclable logistics apparatuses are stacked as a stack, the subsequent work efficiency is doubled, the time is greatly saved and the workload is reduced.

The method embodiments of the present invention all can be realized by software, hardware and firmware etc. Regardless of the present invention is realized by software, or hardware, or firmware, instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc(DVD) etc.

Recyclable logistic apparatuses are widely used in machinery, automobile, home appliance, food and cosmetic industries etc. which can be used as packages for packing various production materials in the process of supply chain, and because the logistics apparatuses can be folded in an empty state, and 75% of space can be effectively saved, the logistics apparatuses are suitable for recycling and effectively replace disposable packages of paper, wood, iron etc. In view of this feature, a recyclable logistics apparatus is in an upright state under working condition, and is in a folded state under empty and non-working condition.

The above stack case will be described in detail with reference to FIGS. 2-7 in the following.

Figure 2:
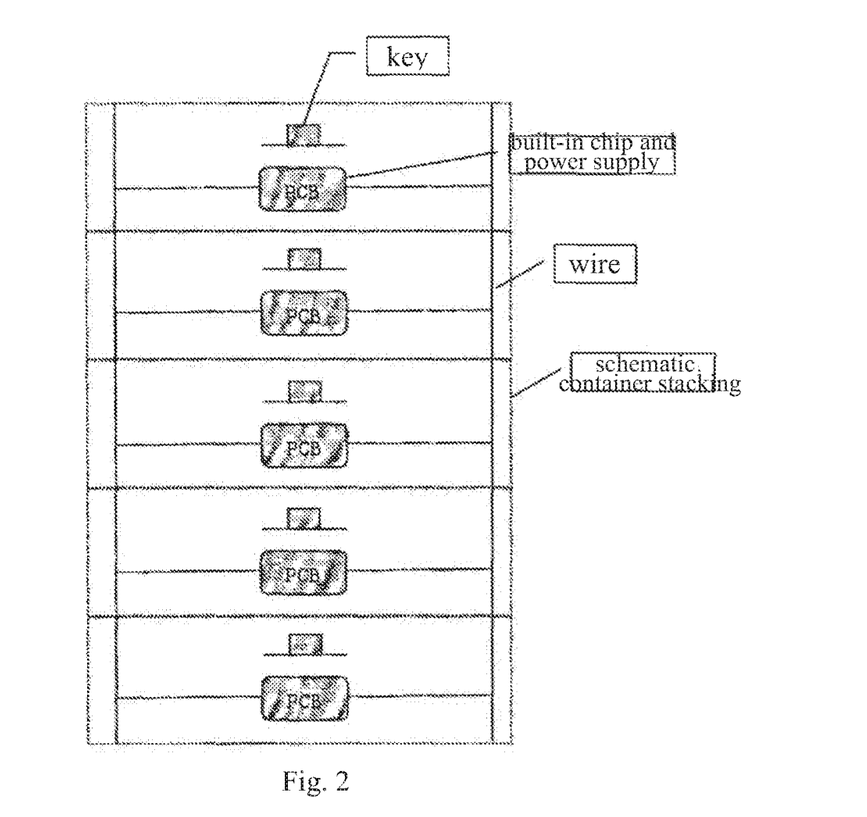
FIG. 2 is a schematic diagram of a stacking method of recyclable logistics apparatuses according to first embodiment of the present invention.
Figure 3:
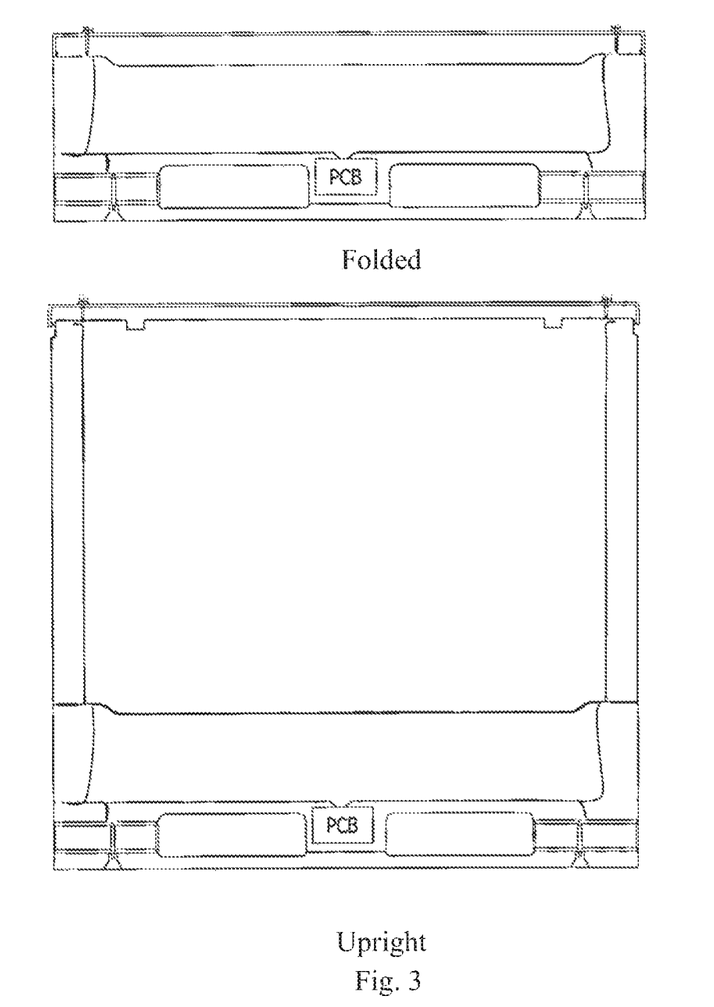
FIG. 3 is a wiring diagram of a single recyclable logistics apparatus in the stacking method of FIG. 2 when being folded and upright.

As shown in FIG. 2, when stacked, the wireless beacon units built in respective containers are connected with contact points between box components and between boxes through wires, thereby forming a parallel structure of circuits. In this case, a key is also provided on the recyclable logistics apparatus, and when the key is pressed, information contained in the broadcast frame transmitted by the wireless beacon unit can be changed. For example, the key can be pressed when battery power is insufficient. FIG. 3 shows a wiring diagram of a single apparatus in the stack shown in FIG. 2 when being folded and upright. The connection is made, for example, by wires, contact points and spring needles etc.

A main point of an exemplary stacking of recyclable logistics apparatuses is as following, and the main point is merely an exemplary example and is not limited thereto:

(1) Corresponding wires are implanted inside the apparatus for connecting to the wireless beacon unit, contact points etc. (corresponding to the above step S101).

Figure 4:
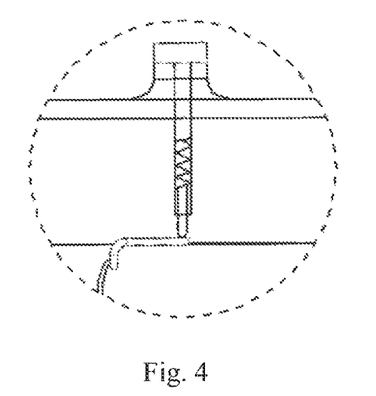
FIG. 4 is an enlarged schematic diagram of spring sheets connection in the wiring of FIG. 3.
Figure 5:
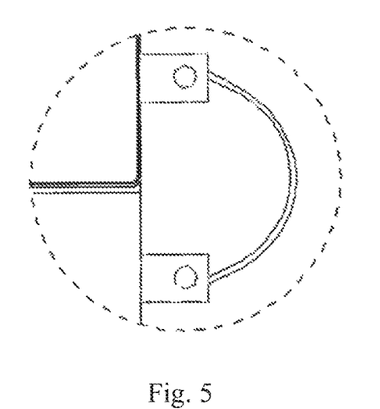
FIG. 5 is an enlarged schematic diagram of external wire or connector connection in the wiring of FIG. 3.
Figure 6:
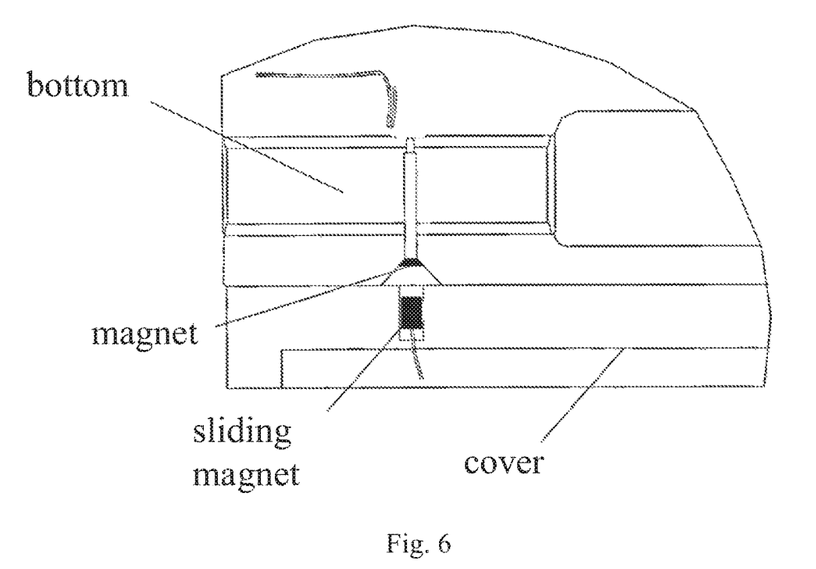
FIG. 6 is an enlarged schematic diagram of magnetic adsorption connection in the wiring of FIG. 3.

(2) There can be a plurality of connection types between contact points, such as spring sheets connection, external wire connection, magnetic adsorption connection etc. FIGS. 4-6 respectively show these connection types in an exemplary manner.

(3) Components of a recyclable logistics apparatus itself, two stacked recyclable logistics apparatuses all can be connected through the mentioned connection types. When the connections are OK, circuits will be formed in a region inside this stack of logistics apparatuses and become parallel (corresponding to the above step S102).

Figure 7:
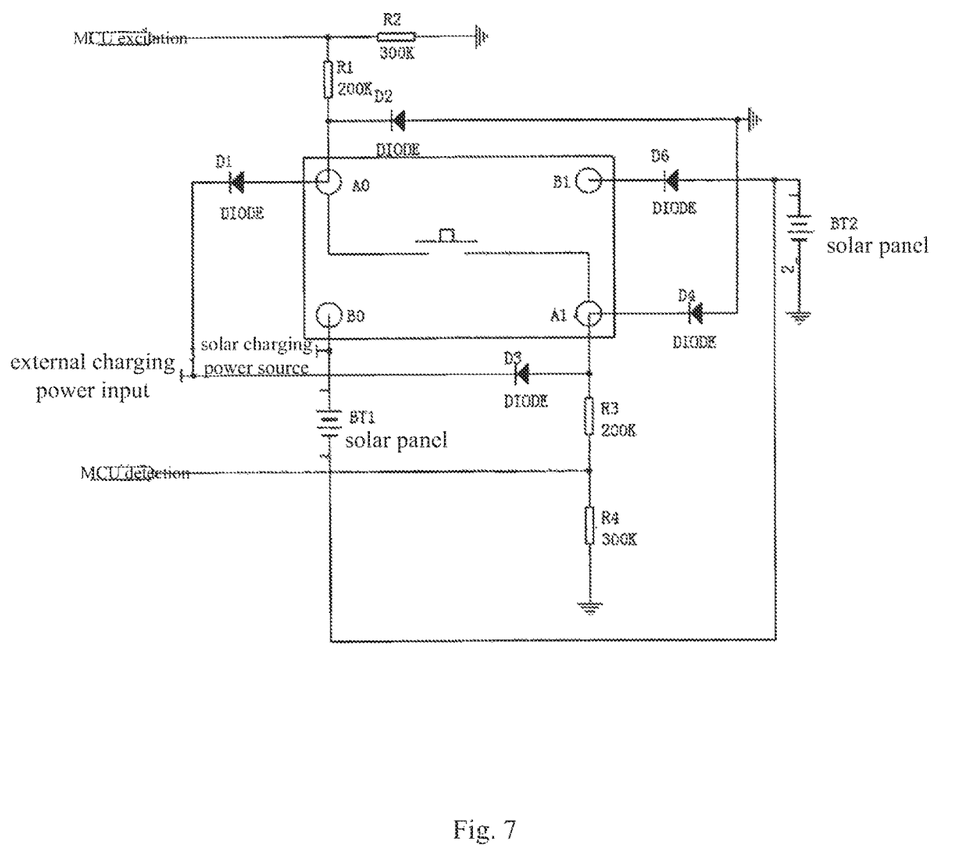
FIG. 7 is internal circuit diagram of a single recyclable logistics apparatus in the stacking method of FIG. 2.

(4) FIG. 2 shows a case where four corners of the recyclable logistics apparatus are provided with four contact points, and of course, the setting location is not limited to a corner and the number of contact points is not limited to four either. In consideration of disorderly stacking along the same direction, a bridge rectifier circuit is utilized on an internal line of the box to ensure that even if opposite electrodes are connected, boxes can still be connected with each other and conduct power or signal. An exemplary example of an internal circuit diagram is shown in FIG. 7.

As described above, when electrical loops are formed inside recyclable logistics apparatuses and can be connected with each other when stacked, a foundation is laid for subsequent work. For example, when subsequent identification is performed, a workload of later identification will be greatly reduced, which doubles the work efficiency and reduces labor and time costs. For example, when subsequent charging is performed, the work efficiency is also doubled and labor and time costs are reduced.

An example of the subsequent work for identification is as following.

At this time, the broadcast frame further includes identification information. For example, when the wireless beacon unit is a chip based on iBeacon protocol, the structure of the broadcast frame is: UUID domain, Major domain, Minor domain, RSSI domain. Wherein, UUID (Universally Unique Identifier) domain is a unique serial number of an apparatus, i.e. a unique identity of the wireless beacon unit, RSSI domain is wireless signal strength information which indicates a strength value of a node signal received by a receiving equipment, and the remaining Major domain and Minor domain are dynamic information domains which may contain various information based on intra-domain encoded information. At this time, a specific bit in the broadcast frame (for example, the most significant bit in Major domain) is initially set to 0, which is taken as the identification information, and if 0 is changed to 1, it is marked. The recyclable logistics apparatuses are preferably stacked as a plurality of stacks, and when one recyclable logistics apparatus in a stack is marked out, all the recyclable logistics apparatuses in this stack are marked out. That is, the marking (identification) efficiency has been doubled. In the case where a batch of recyclable logistics apparatuses are identified and transported from a sender to a receiver through a transporter, first mobile terminal, for example, a smartphone belonging to the sender of the recyclable logistics apparatuses, can learn how many most significant bits in Major domains in the broadcast frames transmitted by the wireless beacon units of recyclable logistics apparatuses have been changed from 0 to 1 by receiving the broadcast frames, so that these recyclable logistics apparatuses are obviously the recyclable logistics apparatuses required to be identified, and their unique identities (UUID) of wireless beacon units are uploaded to a cloud server. The cloud server generates and returns authentication information after having received the unique identities (UUID) of wireless beacon units of those recyclable logistics apparatuses required to be identified.

Preferably, the authentication information includes: location information, enterprise information, time information and product information. In this way, it is advantageous to check the following information: geographical location of the sender of recyclable logistics apparatus, name of the sender of recyclable logistics apparatus, sending time of the sender of recyclable logistics apparatus, products loaded in the recyclable logistics apparatus to be sent. Of course, the authentication information may also include other information, which is not limited.

Preferably, the cloud server also returns the authentication information to second mobile terminal, and the second mobile terminal also receives the broadcast frame and uploads the unique identities of wireless beacon units of marked recyclable logistics apparatuses and the authentication information as second upload information to the cloud server for authentication. Still taking the above case as example, if the first mobile terminal belongs to the sender, the second mobile terminal may belong to the transporter or the receiver, and as the transporter or the receiver, the second mobile terminal can learn how many most significant bits in Major domains in the broadcast frames transmitted by the wireless beacon units of recyclable logistics apparatuses have been changed from 0 to 1 by receiving the broadcast frames, and their unique identities (UUID) of wireless beacon units and the authentication information are uploaded together to the cloud server, then the cloud server can perform authentication, which ensures the data at both sides of the sender and the transporter, or the data at both sides of the sender and the receiver consistent so as to perform delivery smoothly.

Further preferably, the cloud server returns an authentication result of the second upload information to the second mobile terminal. Still taking the above case as example, when the data at both sides of the sender and the transporter, or the data at both sides of the sender and the receiver are not consistent, this step also serves as a reminder, for example, when a recyclable logistics apparatus included in the second upload information uploaded by the receiver comprises other apparatus which is not included from the authentication information, the authentication of the cloud server will make screening according to the authentication information, so as to filter out the apparatus not belonging to this send. Another case is, for example, when the recyclable logistics apparatus included in the second upload information uploaded by the receiver lacks the apparatus which should be included from the authentication information, the authentication of the cloud server would remind whether a detection or an upload is missed.

An example of the subsequent work for charging is as following.

At this time, the broadcast frame further includes battery power information. For example, when the wireless beacon unit is a chip based on iBeacon protocol, the structure of the broadcast frame is: UUID domain, Major domain, Minor domain, RSSI domain. Wherein, UUID (Universally Unique Identifier) domain is a unique serial number of an apparatus, i.e. the unique identity of the wireless beacon unit, RSSI domain is wireless signal strength information which indicates a strength value of a node signal received by a receiving equipment, and the remaining Major domain and Minor domain are dynamic information domains which may contain various information based on intra-domain encoded information. At this time, a specific bit in the broadcast frame (for example, the most significant bit in Major domain) is initially set to 0, which is taken as the battery power information, and if 0 is changed to 1, it is marked, indicating that the battery power is insufficient.

Figure 11:
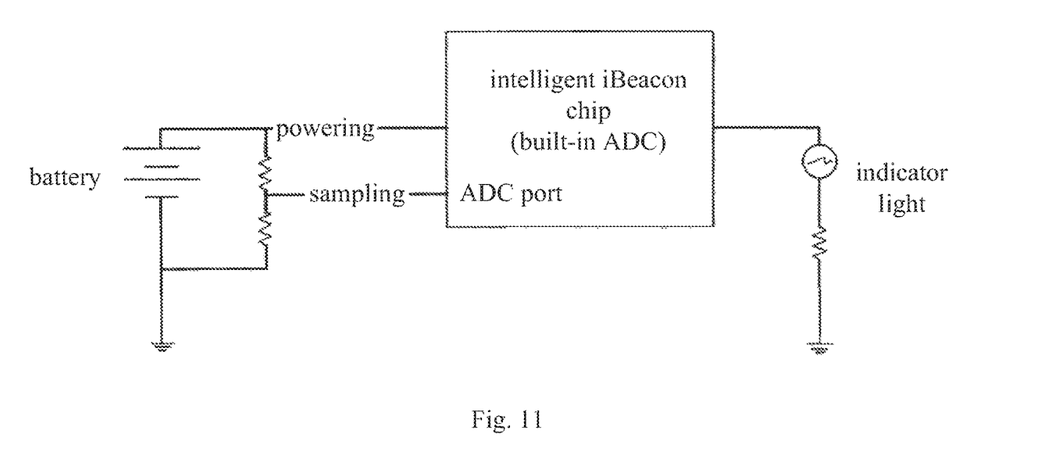
FIG. 11 is an enlarged schematic diagram of a prompt unit of recyclable logistics apparatus according to first embodiment of the present invention.

Preferably, the recyclable logistics apparatus further comprises a prompt unit which provides a prompt that battery power is insufficient. As shown in FIG. 11, the recyclable logistics apparatus has an indicator light as the prompt unit. For example, there are two LEDs in a diagonal direction on the apparatus as the indicator light, which start to emit light (for example turning red) when the battery power is insufficient.

A terminal, for example, a broadcast signal receiver belonging to a maintainer of recyclable logistics apparatus, can learn how many most significant bits in Major domains in the broadcast frames transmitted by the wireless beacon units of recyclable logistics apparatuses have been changed from 0 to 1 by receiving the broadcast frames, so that these recyclable logistics apparatuses are obviously the marked recyclable logistics apparatuses with insufficient battery power, and their unique identities (UUID) of wireless beacon units are uploaded to the cloud server.

Figure 8:
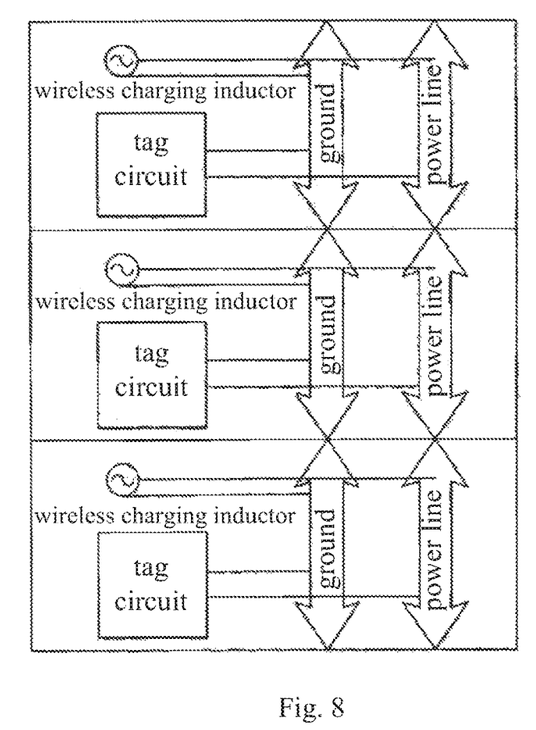
FIG. 8 is a schematic diagram of the stacking method in FIG. 2 utilized for a charging process.

At this time, when a stack of apparatuses are located within a wireless charging area, all apparatuses in this stack can be charged when a power receiving module within any apparatus is coupled with or in magnetic resonance with or in magnetic induction with an external power transmitting module. FIG. 8 is a schematic diagram of this charging process. As shown in FIG. 8, because logistics apparatuses are connected with each other through lines when stacked, a stack of apparatuses can supply power to each other, and plus the use of a bridge rectifier circuit, it would not affect supplying power to each other even if the apparatus is stacked in reverse direction.

In the above case where subsequent charging is performed, a specific bit in the broadcast frame may include battery power information. A battery built in the apparatus may be sustainably used for about two years in general case, and when battery power insufficiency of the built-in battery is detected, the battery power information will be continuously broadcasted outward, meanwhile a prompt unit on the apparatus provides a prompt, for example, two LEDs are provided in a diagonal of the apparatus as the prompt unit and the LED starts to emit light (for example turning red) so as to warn that the battery power is low. When it is fully charged, the battery power information broadcasted outward shows that the battery power is normal, and the prompt unit does not provide a prompt so that the warning is removed. In this way, it is substantially possible to increase the battery life of a power supply unit of the wireless beacon unit from original two years or so to about eight years which is close to the life of the recyclable logistics apparatus itself, so that it is not necessary to make replacement frequently.

The power supply unit of the recyclable logistics apparatus can be a power supply unit of various structures. Preferably as shown in FIG. 7, the power supply unit may comprise an external power supply access and a rechargeable battery, but not limited thereto. The power supply unit may not be the structure in FIG. 7, and is for example storage battery etc.

Figure 9:
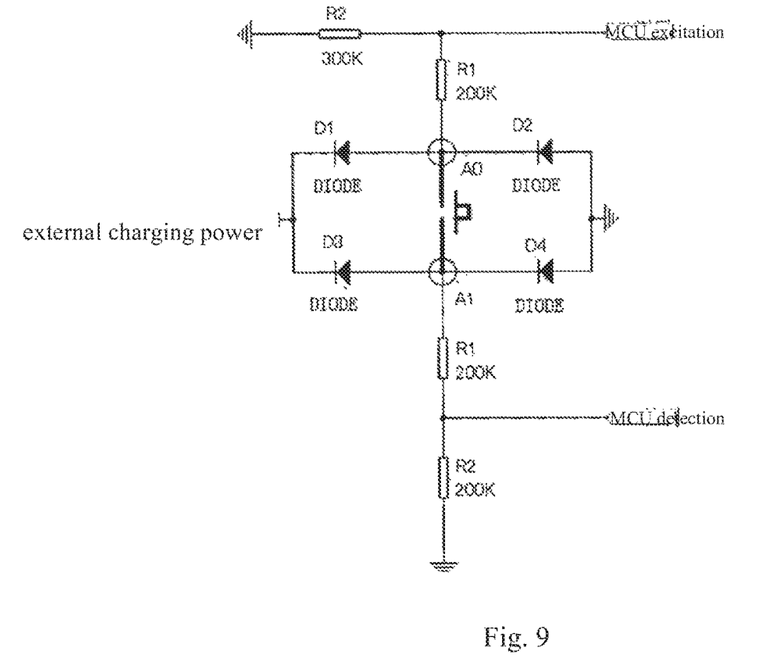
FIG. 9 is a schematic diagram of a configuration when the internal circuit diagram in FIG. 7 is used for circuit sharing.

The above examples respectively describe the cases of the subsequent processing for identification or charging, and in order to share a circuit in both cases, a configuration is show in FIG. 9.

In combination of the above description, wiring features of the circuit can be summarized as following:

(1) Each apparatus has four metal columns, respective apparatuses are connected with each other, and metal columns A0/A1 form an external charging and key circuit, metal columns B0/B1 form a solar battery line. Placing the apparatus in rotation of 180 degrees would not affect corresponding functions.

(2) In a charging and key equivalent circuit, the internal charging is performed through a bridge rectifier circuit, so that placing the apparatus in rotation would not affect positive and negative directions of electrodes.

(3) The detection logic of a key is: whether there is a voltage at MCU detection point is detected first, if there is, it waits for random avoidance time, if not, a MCU excitation end sends a voltage and it detects the voltage at the MCU detection point.

(4) When the apparatus is connected in forward direction or partly reversed direction, the circuit ensures a correct voltage at the solar charging power source.

When charging is performed by inserting the charging equipment, i.e. a wired charging is performed, the configuration shown in FIG. 9 can be directly utilized.

Figure 10:
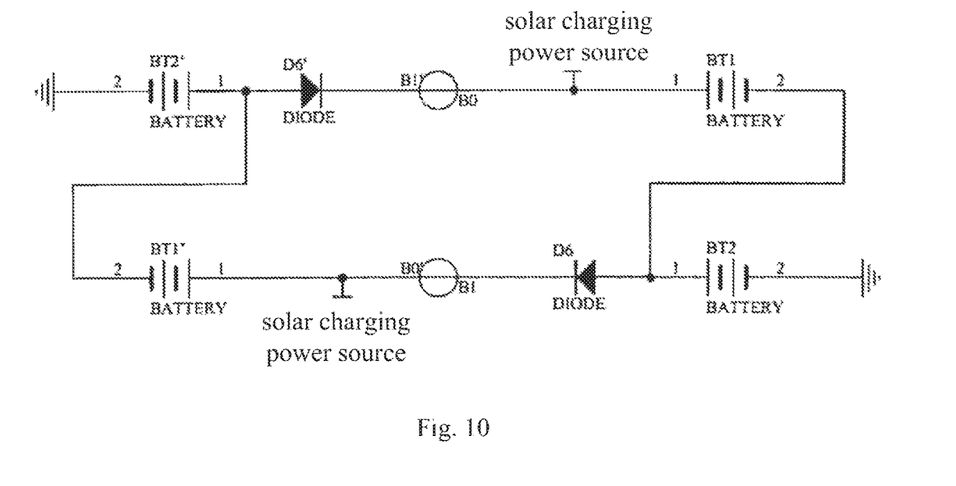
FIG. 10 is a schematic diagram when the charging process in FIG. 8 is solar charging.

The above rechargeable battery may be for example a solar panel, and when the apparatus is irradiated by light, light energy can be collected through the solar panel and transformed into electric energy which is stored in the power supply unit, the schematic diagram of solar charging is shown in FIG. 10. In this case, a key is also provided on the recyclable logistics apparatus, and when the key is pressed, information contained in the broadcast frame transmitted by the wireless beacon unit can be changed. For example, the key can be pressed when battery power is insufficient.

Figure 12:
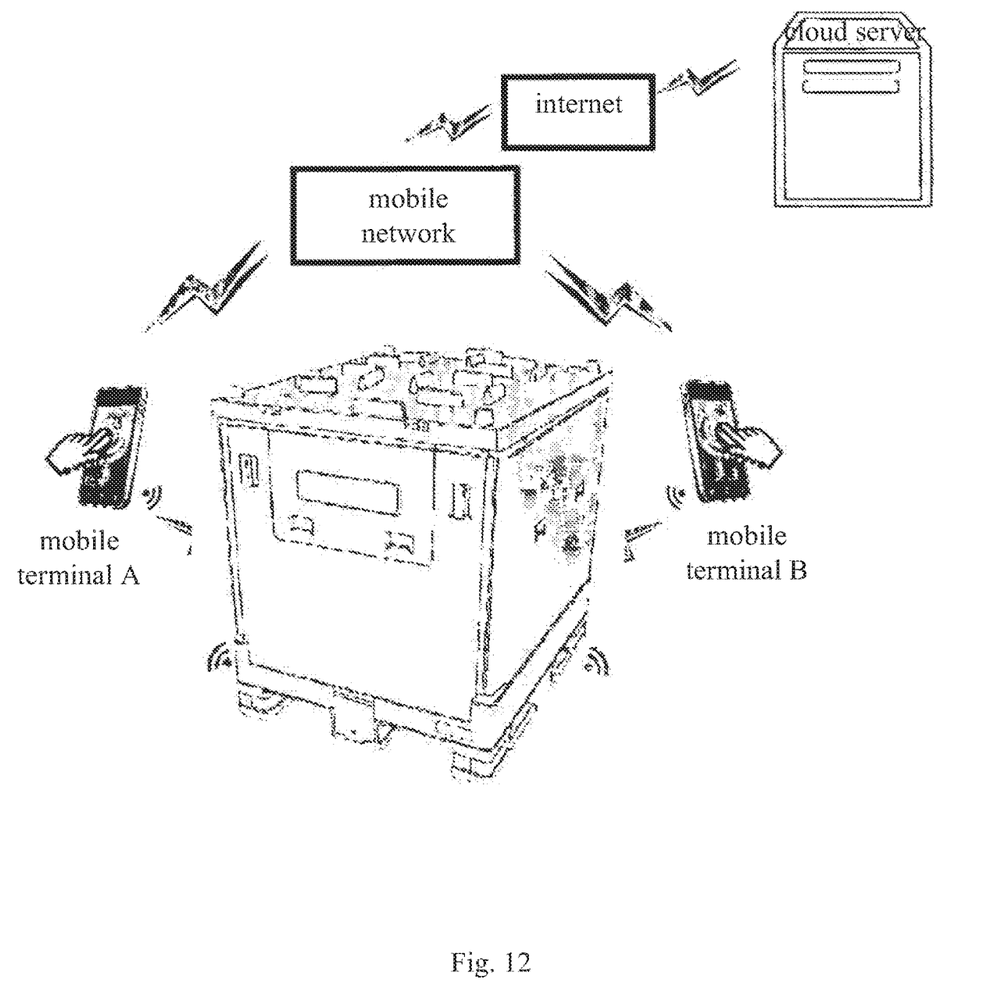
FIG. 12 is a schematic diagram of an application scenario of a power supply method of recyclable logistics apparatus according to first embodiment of the present invention.

Of course, the charging method is not limited to FIGS. 9 and 10, for example wireless charging may also be performed, and when a stack of apparatuses are located within a wireless charging area, all apparatuses in this stack can be wirelessly charged when a power receiving module within any apparatus is coupled with or in magnetic resonance with or in magnetic induction with an external power transmitting module FIG. 12 is a schematic diagram of an application scenario of the method in the above embodiment.

As shown in FIG. 12, recyclable logistics apparatuses are connected by the above method, the recyclable logistics apparatus comprises a wireless beacon unit based on iBeacon protocol which periodically transmits a broadcast frame, the broadcast frame at least includes UUID of the wireless beacon unit and identification information in Major domain, and all the recyclable logistics apparatus(es) required to be identified or with insufficient battery power, are marked by changing the identification information in Major domain; mobile terminal A or mobile terminal B receives the broadcast frame(s), and uploads unique identity(es) of the wireless beacon unit(s) of the marked recyclable logistics apparatus (es) required to be identified or with insufficient battery power as upload information to a cloud server; the cloud server returns subsequent authentication information or maintenance command to the mobile terminal A or the mobile terminal B after having received unique identity(es) (UUID) of the wireless beacon unit(s) of those marked recyclable logistics apparatus(es) required to be identified or with insufficient battery power.

Preferably, a mobile terminal is, for example, a mobile phone, a tablet computer, a notebook computer, a personal digital assistant (PDA) etc.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

What is claimed is:

1. A method for connecting a plurality of recyclable logistic containers, each of the plurality of recyclable logistic containers comprises a wireless beacon unit which periodically transmits a broadcast frame, and a power module that supplies power,
wherein the method comprises the following steps:
providing four contact points on four corners of the each of the plurality of recyclable logistic containers, wherein the four contact points include positive and negative electrodes are set apart from one another, and implanting wires inside each of the plurality of recyclable logistic containers for connecting the wireless beacon unit, and
connecting the plurality of recyclable logistics containers in a predetermined manner, so that when the plurality of recyclable logistics containers are stacked as a stack, a parallel circuit is formed in part region inside the stack of recyclable logistics containers,
wherein each of the plurality of recyclable logistic containers also includes a bridge rectifier loop, where a first pair of diagonally opposite points of the bridge rectifier loop are connected with the two contact points of the four contacts points of the recyclable logistic container having opposite polarities, and a second pair of diagonally opposite contact points of the bridge rectifier loop are connected with the power module and a key, and the bridge rectifier loop is configured to allow flow of current through the respective recyclable logistic container in a direction that is consistent with respect to the power module when the recyclable container is positioned in a first orientation and a second orientation,
wherein the second orientation being different from the first orientation with respect to a position of the contact points, and
wherein when the key is pressed, the wireless beacon unit transmits the broadcast frame to indicate insufficient power.

2. The method according to claim 1, wherein the predetermined manner is spring sheets connection manner.

3. The method according to claim 1, wherein the predetermined manner is external wire connection manner.

4. The method according to claim 1, wherein the predetermined manner is magnetic adsorption connection manner.

5. The method according to claim 1, wherein the wireless beacon unit is a chip based on one of the following protocols: radio frequency identification (RFID), Zigbee, Bluetooth, WiFi, or iBeacon.

6. The method according to claim 1, wherein the broadcast frame at least includes a unique identity of the wireless beacon unit.

7. The method according to claim 6, wherein the broadcast frame further includes battery power information.

8. The method according to claim 6, wherein the broadcast frame further includes identification information.

\* \* \* \* \*